US012780302B2

(12) United States Patent
Calogera Alaimo

(10) Patent No.: US 12,780,302 B2
(45) Date of Patent: Nov. 3, 2026

(54) VEHICLE STEERING SYSTEM

(71) Applicant: Samantha Maria Calogera Alaimo, Genoa (IT)

(72) Inventor: Samantha Maria Calogera Alaimo, Genoa (IT)

(73) Assignee: Samantha Alaimo (IT)

( * ) Notice: Subject to any disclaimer, the term of this patent is extended or adjusted under 35 U.S.C. 154(b) by 200 days.

(21) Appl. No.: 18/294,541

(22) PCT Filed: Aug. 5, 2022

(86) PCT No.: PCT/IB2022/057307
§ 371 (c)(1),
(2) Date: Feb. 1, 2024

(87) PCT Pub. No.: WO2023/012738
PCT Pub. Date: Feb. 9, 2023

(65) Prior Publication Data

US 2024/0343301 A1 Oct. 17, 2024

(30) Foreign Application Priority Data

Aug. 6, 2021 (IT) ........................ 102021000021383

(51) Int. Cl.
*B62D 6/00* (2006.01)
*B62D 5/04* (2006.01)

(52) U.S. Cl.
CPC ........... *B62D 6/002* (2013.01); *B62D 5/0442* (2013.01)

(58) Field of Classification Search
CPC .............................. B62D 6/002; B62D 5/0442
USPC ........................................................... 701/41
See application file for complete search history.

(56) References Cited

U.S. PATENT DOCUMENTS

| | | | | |
|---|---|---|---|---|
| 2012/0046833 | A1 | 2/2012 | Sanma et al. | |
| 2013/0127610 | A1* | 5/2013 | Sanma .................... | B62D 1/06 340/438 |

FOREIGN PATENT DOCUMENTS

| | | | |
|---|---|---|---|
| CN | 206704293 | U | 5/2017 |
| GB | 2395469 | A | 5/2004 |
| JP | 2003300468 | A | 12/2003 |
| WO | 2019116453 | A1 | 6/2019 |

OTHER PUBLICATIONS

Search Report and Written Opinion received for PCT Application PCT/IB2022/057307 on Sep. 2, 2023, 12 pages.

* cited by examiner

*Primary Examiner* — Lindsay M Low
*Assistant Examiner* — Omar Morales

(57) ABSTRACT

Steering system comprising a rotatably mounted command member, the rotation of which is aimed at transmitting first command signals to a steering box, the steering box sets the steering angle of the wheels of a vehicle.

Figure 1:
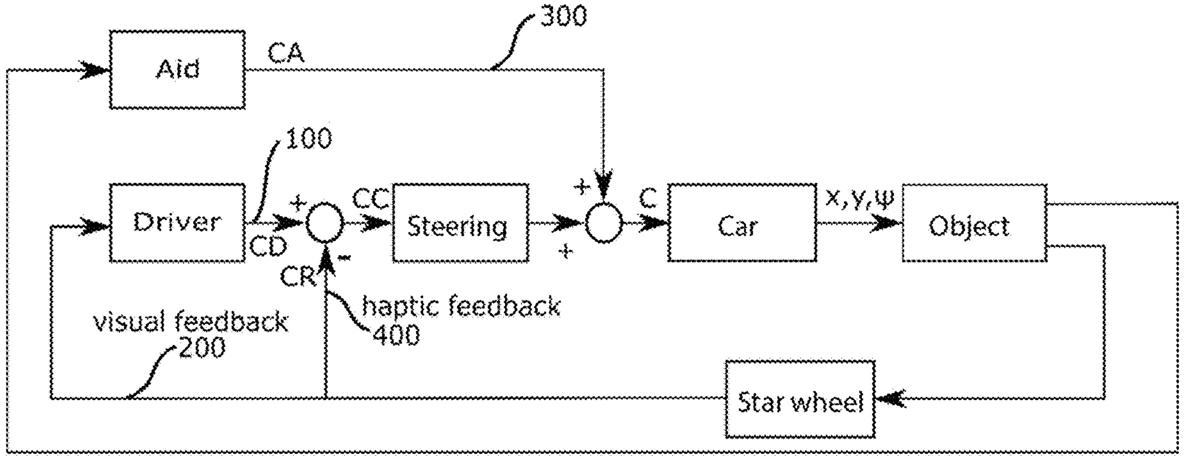

The command member comprises a star wheel mounted inside said command member in a rotatable manner with respect to said command member, there being a system of sensors aimed at detecting the distance of the vehicle from reference points, such as objects, road strips or the like.

Said sensor system is connected at least to said star wheel, said sensor system comprising means for activating the rotation of the star wheel, which activation means are configured to rotate the star wheel in the direction of said reference points.

10 Claims, 5 Drawing Sheets

VEHICLE STEERING SYSTEM

The present invention relates to a steering system realized according to the preamble of the attached independent claim.

The present invention concerns a new type of steering and a new steering system that can assist the driver in driving a vehicle.

Although the degree of automation and hence of self-driving of the state-of-the-art vehicles is growing, for safety reasons, the presence of human action is required to ensure driving safety. And also, but not only, under certain conditions of poor visibility of the constraints (lane lines, obstacles, other cars or guard rails) for example in the event of fog, both automatic action and human action are required to be present. In addition, the presence of a force feedback that acts directly on the steering, can be useful to compensate for visual feedback when it is limited or absent. The sensors see where the driver sometimes fails (for example in case of fog or rain or other or because the attention of the driver is lowering or in case of distraction) and vice versa (for example obstacles in the blind corner of the cameras installed on the vehicle or in the case where for example the lane lines are not clearly visible to the sensors or the rail guard is absent or in the presence of road construction sites).

Furthermore, if automation is overused, the driver may be less aware of what is happening to the vehicle, he is obliged to monitor it more and for this reason he may get tired, or if he relies too much on automation, he may not be ready to regain control in case of need, or, on the contrary, he may be wary of it.

For all these reasons, the present invention aims at achieving a “collaboration” between automatic action and human action, whilst the state of the art provides that the one excludes the other, in the sense that the intervention of the driver (who accelerates or brakes or if he intervenes on the steering with a sufficient torque for a lane change) while the automatic system is in operation, usually temporarily deactivates the automatic system itself. In the present invention, when choosing to select one of the modes of driving aid, the two playing protagonists (driver and aid) collaborate (either always or only when necessary, that is, when the sole action of the driver is not sufficient to perform the task) and the input used to command the actual steering on the axle of the wheels is composed of the inputs of both players.

In addition, on the autonomous driving systems currently on the market, the state of the art provides that the force feedback felt on the steering has the same direction as what would be needed to perform the task (for example, obstacle on the left, the automation rotates the steering wheel to the right) and therefore the driver must follow and trust it, but this could not only make him feel “excluded” by feeling less authority in the control over the vehicle, but it also could pose a problem: there is a risk that the result of the action commanding the actual steering on the axle of the wheel is to move towards the obstacle if, for example, having limited visibility and/or under particular stress conditions, the driver should not trust the aid or in any case if he should follow his instinct to oppose to the input of the aid. In fact, as described within the document Schmidt, A., Lee, D., Motor Control and Learning, A behavioral Emphasis, 4th Ed., Human Kynetics, 2005, the human being tends to oppose with a very small latency of 30-50 ms to sudden changes in the position of a limb with an action (called stretch reflex) that unconsciously tends to bring the limb into the initial position before the disturbance, without involving the stages of information processing; in fact, 150-200 ms are necessary for the information to be consciously processed by the stages of information processing.

For these further reasons it is thought that, while the state of the art provides for a rotation of the steering in the same direction as the desired steering, in the present invention it is provided for a rotation of the steering in the opposite direction, having in mind that the driver by unconsciously opposing to the action of the aid, in the end steers the car in an unconscious manner in the right direction in order, for example, to avoid an obstacle. Even though, for safety, this rotation is not considered on the axle of the wheels where an electric motor is actuated which steers safely in the direction, for example, for moving the vehicle away from the obstacle to be avoided.

To achieve these objectives, the present invention provides a steering system in accordance with the characterizing part of the independent claim appended to the present patent application.

In particular, the system object of the present invention uses a new type of steering and, in the steering box and depending on the type of vehicle (with mechanical or electronic/electric connection) between steering and steering box, an epicyclic toothed wheel or an actuator commanded by a computer that serves both to take account of the inputs (aid and driver) and to ensure that the final steering is harmonious.

As far as the steering is concerned: this has a different conformation from the one currently on the market. In particular, both the steering wheel and the aid acting on the rack of the axle of the wheels, consist of two parts: one commanded by the driver, the other by the obstacle sensors (infrared, ultrasonic, or radar or equivalents) or any other task that it is wished to perform.

- The driver grabs the steering that is integral with a steering column connected in some way to the axle of the wheels;
- The sensors are instead connected to an electric circuit that actuates or not, depending on the driving mode, on the one hand a sort of “star wheel” that is free to move coaxially and “inside” the steering regardless of the movements imposed on the steering by the driver; on the other hand, an “aid” that acts in some way on the axle of the wheels.

As anticipated and as will be described later, the star wheel tends to rotate in the “opposite” direction with respect to the ideal rotation of the steering member to perform a certain task by the driver.

During the operation of the vehicle, the star wheel is then oriented and rotated in the direction of the reference points identified by the sensors.

For example, in case the driver has to dodge an obstacle (reference point) on the right with respect to the vehicle, the star wheel will be oriented and rotated to the right, i.e., in a clockwise direction, so that the driver instinctively rotates the command member in the opposite direction with respect to the rotation of the star wheel.

Steering side, the sensors are connected to a servo and/or to a gear and/or to an electric motor that rotates the star wheel “towards” the object (for example, an obstacle or the side line for holding the lane, or the virtual centre line of the lane for it to be followed by the vehicle) when this is detected at a distance (in absolute value) less than a certain value (which will be called activation value for example at 1.5 m or even less or more depending on the task) or in any case when it can be seen from a prediction calculation through a mathematical model of the vehicle that the action of the driver alone is not sufficient to perform the task. In detail, sensors could be positioned at the corners of the car (or in any other position depending on the task). When they detect the object (in real time or in a "future" time in the sense of predicting a "future" distance between vehicle and object) at a distance in absolute value lower/higher (depending on the task) than the activation value, an electric circuit is powered that actuates the star wheel. This rotation will be "opposite" to the one needed because it has been shown that instinctively the human being tends to oppose to sudden movements, as previously described.

On the side of the axle of the wheels, something similar happens with the sensors that actuate an "aid" that acts on the axle of the wheels. In this case, for safety reasons, the rotation imposed on the car through the axle of the wheels, will be in the direction that leads the car to move away from the object (in case this is an obstacle to be avoided) or to approach the object (in case this is an objective to be reached).

Steering side, due to the non-synchronous rotation of the two parts of the steering (the star wheel will move with respect to the steering grabbed by the driver), a cover of the "area" of the steering in plexiglass or similar material will be used for safety and also to allow the driver to see the dashboard display. Seeing and/or sensory sensing (depending on the driving mode set) the movement of the star wheel will indirectly help the driver to perform the task (for example to avoid obstacles or follow a determined road or lane).

In particular, the presence of a cover element of the steering member made of transparent material, such as plexiglass or the like, is envisaged.

Said cover element in transparent material is mounted integral with the steering member, so that an action by the user on the cover element allows the steering member to be moved, for steering the wheels.

The presence of the cover element in transparent material is a particularly important aspect, since the star wheel is located inside the steering member and the cover element allows the user (the driver) to view the star wheel and, consequently, its movement.

It follows that the user will not have any part of the body, and in particular of the hands, in contact with the star wheel, but he will have visual feedback thereof and will tend, as also described later, to oppose to the rotation movement of the steering member with respect to the rotation movement of the star wheel.

As will be described later through the illustration of some embodiment examples, the driver will also have haptic feedback in the event that the star wheel is mechanically connected to the steering member: in this case, the movement of the star wheel will be transmitted to the steering member (and to the possible cover element in transparent material) and, consequently, the user will also have haptic feedback.

These and further objects of the present invention are achieved by a bottling system according to the appended independent claim and the sub-claims.

Optional features of the system of the invention are contained in the appended dependent claims, which form an integral part of the present disclosure.

What is described is detailed through figures to better understand the disclosed advantages and features of the invention. Such figures are for illustrative purposes only without limiting the present invention in any way.

FIG. 1 presents an overall block diagram showing all the various modes of the invention together. Depending on the mode, all or some of the four numbered paths are considered.

Figure 2:
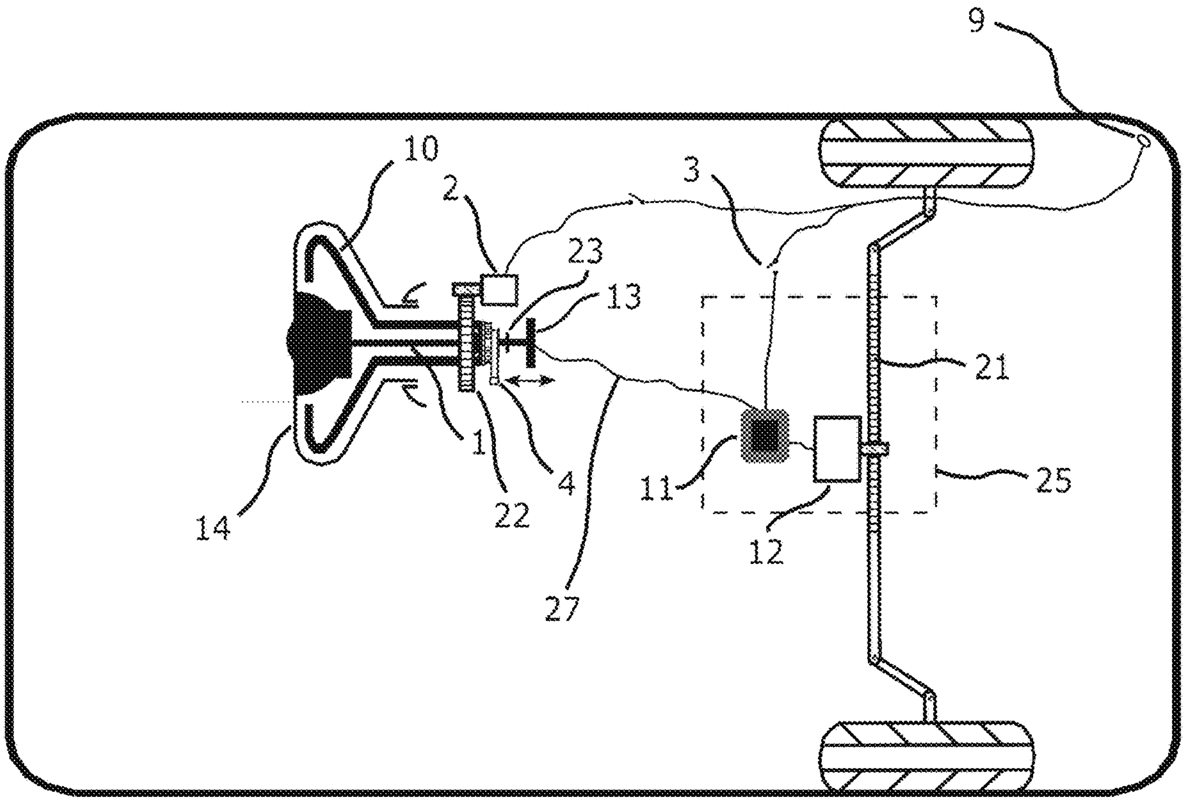

FIG. 2 presents a configuration of the invention that can be applied to vehicles that have an electronic/electric connection between steering and steering box (version Drive By Wire, DBW/video games).

Figure 3:
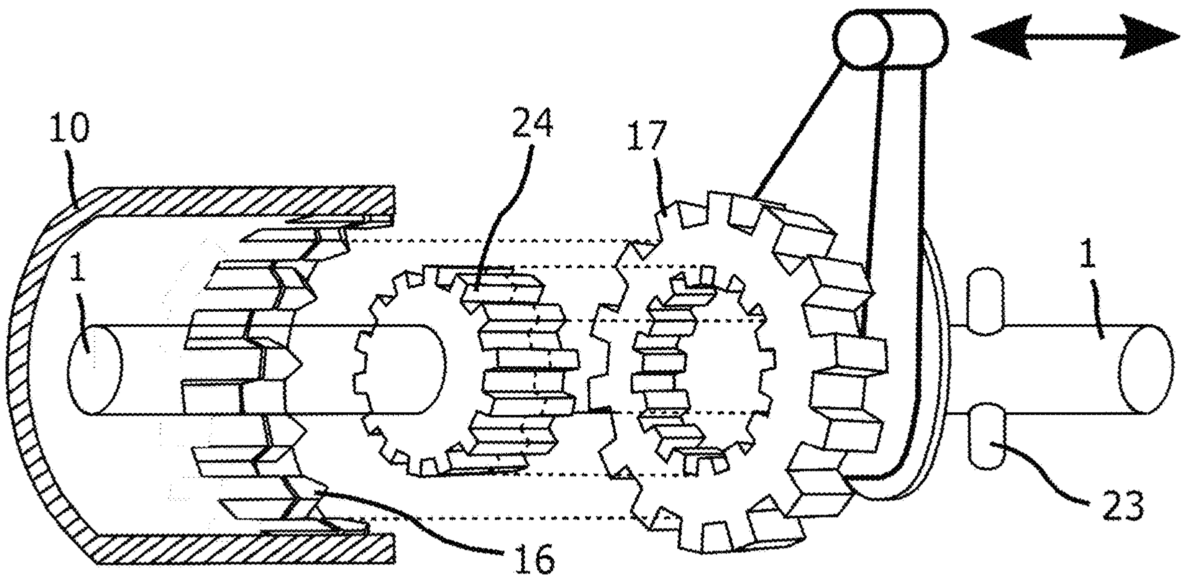

FIG. 3 presents how the coupling between steering and star wheel (clutch) can be achieved both in the mechanical version (see below) and in the DBW version of the invention.

Figure 4:
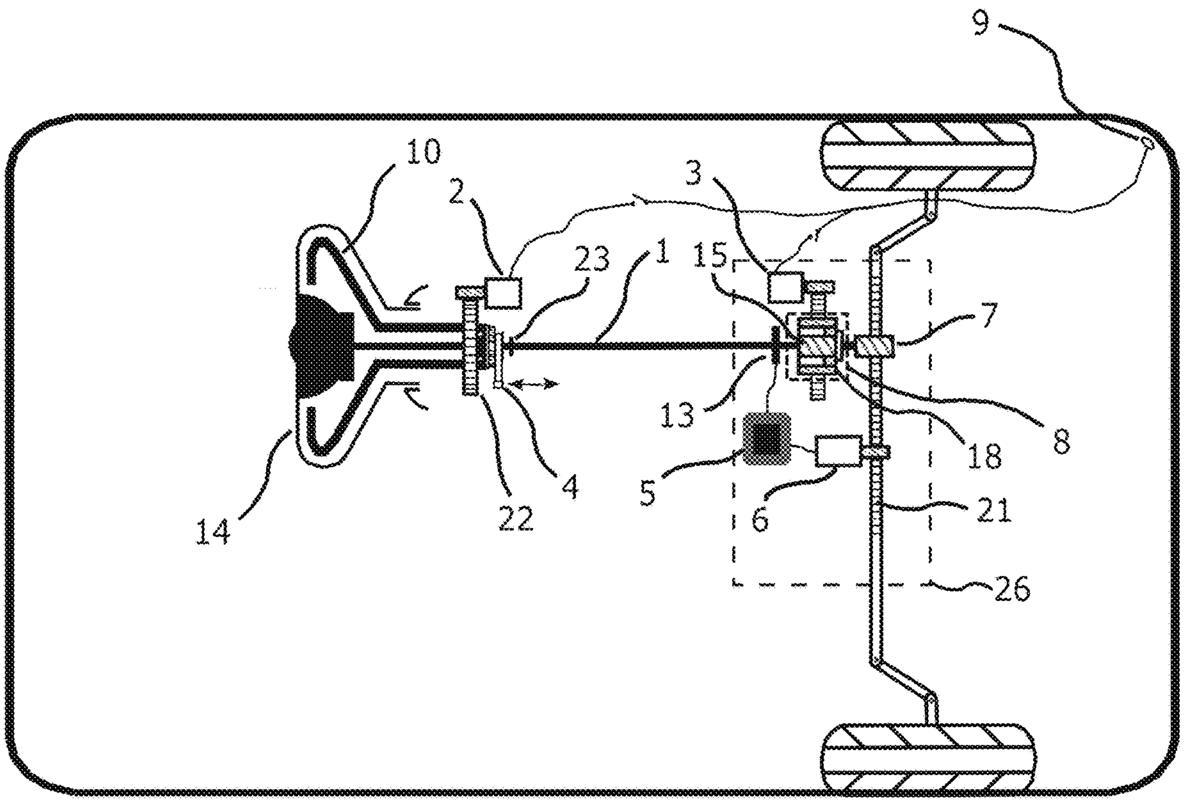

FIG. 4 presents a configuration of the invention that can be applied to vehicles having a direct mechanical connection between steering and steering box (Mechanical version).

Figure 5:
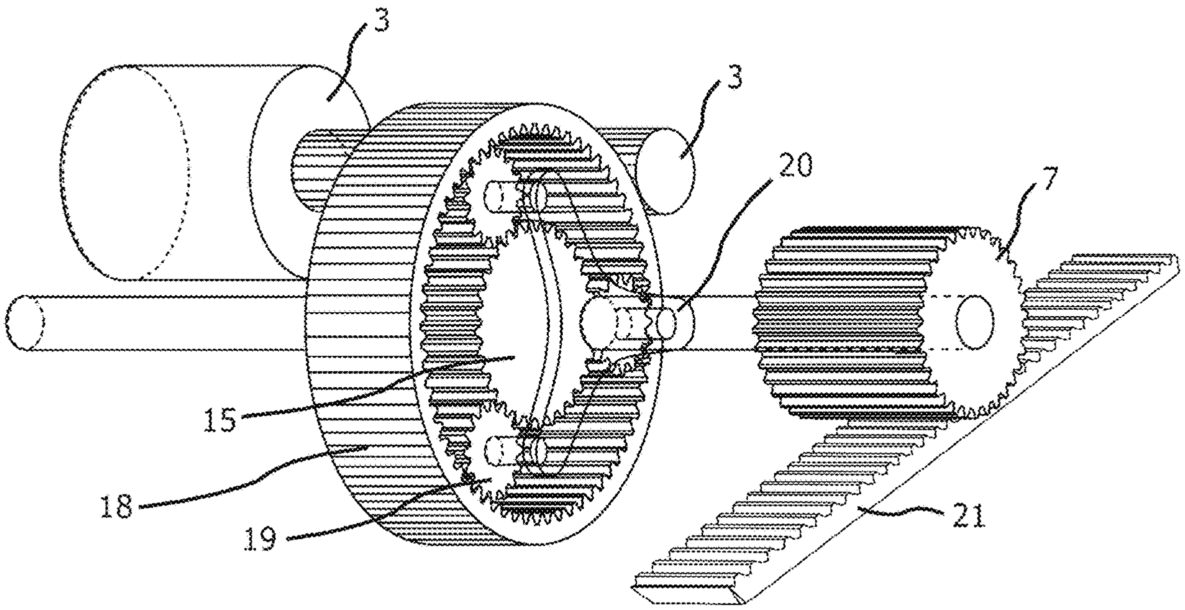

FIG. 5 presents how the coupling between steering column and axle of the wheels (by means of an epicyclic gear train) is achieved in the mechanical version of the invention.

The driving modes that can be set are 5:

A) INDIRECT (BASIC) AID: the driving aid is only visual, due to the fact that the driver sees the steering star wheel move, through the plexiglass or similar material, as a function of the proximity of the object on one of the two sides of the vehicle, but actually, the axle of the wheels is commanded only by the driver.

Even if one has only one visual feedback in this case, that feedback can help the driver to perform the task. FIG. 1 will show only the path 100 and 200 and the torque CD exerted by the driver is the only one to have an action, C, on the axle of the wheels of the car.

B) DEVIOUS or HIDDEN AID: when rotating, the star wheel, it is like if it moved the "neutral point" of the steering and therefore the overall steering is given by the combination of the two steerings: the one set by the driver and the one set by the sensors. FIG. 1 will show only the path 100, 200 and 300 and the torques that have an action on the axle of the wheels of the car are CD exerted by the driver and CA exerted by the Aid (i.e., by the automated system consisting of sensors and means for automatic implementation of steering movement). The star wheel turns but the wheels are only affected by CD and CA.

C) IMPULSIVE APPARENT AID: the sensors give an impulse to the star wheel that, in this case, is made integral with the steering for a few instants or seconds and then the driver will perceive the steering move from the torque CR. But this movement is as if it were not transmitted to the axle of the wheels because also the opposite movement is transmitted to the axle (or in any case with a little higher absolute value) and therefore, de facto, the axle of the wheels is commanded initially substantially only by the driver, and then by the driver and by the Aid (the star wheel continues to turn, but the wheels are only affected by CD and CA). FIG. 1 will show all path 100, 200, 300 and 400 (path 400 indicates that the star wheel and the steering are integral), for a few instants or seconds and, then, path 100, 200, 300. So, the torques having an action on the axle of the wheels of the car, will be initially only CD exerted by the driver, CR exerted by the star wheel and CA exerted by the Aid (but it should be noted that if CR and CA are equal in absolute value, de facto, in the first seconds the axle of the wheels is commanded initially substantially only by CD exerted by the driver) and then by CD and by CA.

D) CLEAR and IMPULSIVE AID: the sensors give a pulse and simultaneously move the neutral point of the steering. In practice, the star wheel and the steering are always integral but the torque CA is always added up and therefore CR and CA, if they are equal, cancel each other out and therefore, de facto, the axle of the wheels is substantially commanded only by the torque CD. FIG. 1 will show all paths 100, 200, 300 and 400, and therefore the torques having an action on the axle of the wheels of the car are CD exerted by the driver, CR exerted by the star wheel and CA exerted by the Aid. Note that if CR and CA are equal in absolute value, de facto, the axle of the wheels is commanded only by CD.

E) NO AID: even in the presence of objects, no aid is applied to driving, not even the visual one. The star wheel is in its neutral position and, through the plexiglass or similar material, the driver cannot see it move, if not together with the steering; even the axle of the wheels is commanded only by the driver. FIG. 1 will show only path 100 and therefore the only torque C having an action on the axle of the wheels of the car is CD exerted by the driver.

Note that the amount of torque applied to the star wheel/axle of the wheels starting from the input received from the sensors, can be varied proportionally with respect to the distance of the object, for example, through a potentiometer that produces a greater torque when the distance from the object is smaller.

In addition, the amount of torque applied to the star wheel/axle of the wheels starting from the input received from the sensors is scaled or amplified based on the philosophy it is intended to be adopted with respect to the percentage of aid to be provided to the driver. The suggestion is to make sure that the driver gives most of the input needed to perform his task or in any case that the driver is not completely excluded.

In the Drive By Wire version (FIG. 2), there will be no mechanical connection between steering column (1) and axle of the wheels (21). Putting a torque sensor (13) in the column (1) that reads the torsional moment exerted by the driver will suffice and this will be converted into axial movement of the axle of the wheels through a servo valve or solenoid valve or in any case an actuator (12).

Obviously in this type of connection the use of the classic power steering is not necessary and, on the contrary, an artificial force feedback must be considered to guarantee the driver a certain awareness while driving.

A control unit or a computer (11) will be instead used to appropriately combine, depending on the various driving modes, the torsional torque CD imposed by the driver on the column (1) with the torque CA produced by the aid (3) starting from the sensors (9). In particular, the control unit or the computer (11) will have the task of:

A) Considering the input of the driver (13) as the only input of the servo valve (12) that will actuate the axle of the wheels (21); at the same time the star wheel (10) will move but without the driver perceiving it; the driver does not perceive any feedback from the sensors (9) on the steering (14), E) Considering the input of the driver (13) as the only input of the servo valve (12) that will actuate the axle of the wheels; the star wheel (10) will not move if not together with the steering (14) actuated by the driver: a mechanism similar to that of the clutch with synchronizer ring will make the two parts integral (see FIG. 3); the driver does not perceive any feedback from the sensors (9) on the steering (14);

B, C, D) Considering the input of the driver (13) and the input (3) of the sensors (9) as the input of the servo valve (12) that will actuate the axle of the wheels;

and more, specifically:

in B) at the same time the star wheel (10) will move, but without the driver perceiving it; the driver does not perceive any feedback from the sensors (9) on the steering (14);

in C) for a few instants or seconds an electric circuit is activated that through a servo and/or an actuator, pushes the Clutch (17) (see FIG. 3) until the star wheel (10) and the steering (14) are integral and then the driver will perceive the steering move. The same thing can be accomplished through for example an electromagnet. Then in those few instants or seconds the input of the servo valve (12) will be only that of the driver (13) through the column (1) (2 and 3, which correspond respectively to CR and CA, if they are equal, they cancel each other out because in the opposite direction), then when the electric circuit will be deactivated the servo and/or the actuator will return the Clutch (17) to the initial position (decoupling de facto the star wheel (10) and the steering (14)), the input of the servo valve (12) will consist of the sum or in any case of a combination between the input of the driver (13) through the column (1) and the input (3) of the sensors (9) and at the same time the star wheel (10) will move but without the driver perceiving it; the driver will perceive for a few instants or seconds the feedback of the star wheel (10) on the steering (14) and thereafter no feedback of the sensors (9) on the steering (14);

in D) the electric circuit of the Clutch (4) that actuates the clutch device (17) (see FIG. 3 and FIG. 2) is always active and therefore, by adding or in any case by combining the control unit/computer (11) the input of the driver (13) and the input (3) of the sensors (9), it is actually as if the only input was that of the driver (13) through the column (1) (2 and 3, which correspond respectively to CR and CA, if they are equal, they cancel each other out because in the opposite direction). A mechanism similar to that of the clutch with synchronizer ring (16) or even an electromagnet will make the star wheel (10) and steering column (1) integral; the driver will perceive the feedback of the sensors (9) on the steering (14) all the time when this is active.

A mechanical block (23) must be positioned in such a way that, even when the star wheel (10) and the steering column (1) are decoupled, the coupling between the Clutch (17) and the gear (24) of the steering column (1) remains.

The electric circuit of the Clutch (4) that actuates the clutch device (17) (FIG. 3 and FIG. 2) will never be powered when modes A and B are selected.

In mode C (the first instants or seconds) and D, the electric motor (2) that actuates the pinion of the star wheel (22) and hence the star wheel (10) is also powered and the result is that the movement of the star wheel is perceived haptically as well as seen by the driver.

This type of version (DBW) can also be applied to video games using the same steering/star wheel configuration and considering all the rest "virtual" (the vehicle with a mathematical model, real time and/or future objects and distances, axle of the wheels and input of the axle of the wheels, etc.). Also in this case, when the criteria on the distances detected by the virtual sensors are met and depending on the driving mode, the input is considered to be the torque provided by the driver (13) which is added or in any case combined with the torque produced by the aid (3) and which provides as output a virtual torque that acts on the virtual rack of the axle of the wheels.

The system object of the present invention can be easily applied both to the world of video games and to the world of augmented reality.

As anticipated, in case of application to video games, a real steering wheel and a real internal star wheel are used. In this case the sensors measure virtual distances: the vehicle, the environment, the axle of the wheels and the input of the axle of the wheels, etc. are also simulated.

In case of augmented reality, the whole system works using real or at most calculated distances/sensors through mathematical models and a prediction.

In the Mechanical version (FIG. 4), the steering (14), the star wheel (10), and the torques CR and CA produced by the sensors (both on point (2) and on point (3)), are unchanged compared to the DBW version. In the mechanical version, the pinion of the steering (15) is mechanically connected to the rack of the axle of the wheels (21) through a system of planetary toothed wheels (8) (see detail in FIG. 5). In particular, the steering pinion (15) constitutes the Sun, i.e., the point around which the satellite gears rotate, of an epicyclic gear train, the aid (3) commands the ring (18) thereof. Sun (15) and ring (18) are connected through the planetary gears (19) that command a train carrier (20). The train carrier (20) is integral with the second pinion (7) which is connected to the rack of the axle of the wheels (21).

In this case, the classic electric power steering system (6) will be used: a control unit (5) that feeds itself with the inputs of the various sensors (9) (for example the vehicle speed, the steering torque (13), the steering angle and speed sensor, the number of engine revolutions, etc.) and, starting from the various characteristic bends stored in its inside, detects the torque required for power-assistance and activates the electric power steering motor (6).

Obviously, in FIG. 4 the position of the power steering (6) is purely indicative; in fact, it can also be placed in a different position without compromising the applicability of the present patent. The same applies if, inside the steering box, the transmission does not take place through pinion/rack coupling but following other approaches (for example, "worm" or "recirculating balls"): it is sufficient in this case to replace the pinion/rack coupling shown, with the same type of coupling desired.

It should also be noted that in FIG. 5 the electric motor (3) directly activates the ring (18), whereas in FIG. 4 it activates a toothed wheel that is integral with the ring. The specific coupling between electric motor (3) and ring (18) can be made either directly or indirectly (depending on the space available to house the electric motor (3)) without however compromising the applicability of this patent.

The same applies to the existing coupling between electric motor (2) and pinion of the star wheel (22) and therefore star wheel (10), which can be made either directly or indirectly (toothed wheel integral with the star wheel (10)), depending on the space available for housing the electric motor (2), without however compromising the applicability of this patent.

The operation of mode B will be described below:

The sensors (9) described above are connected, in addition to the pinion of the star wheel (22) and hence to the star wheel (10) (as was said in common in the two DBW/Mechanics versions), also to a second pinion that indirectly acts on the rack of the axle of the wheels (21). Basically, when for example the obstacle to be avoided is close enough on the left of the car, the electric motor (3) will rotate the Ring (18) clockwise. The driver, by acting through the steering (14)/column (1), will rotate the Sun (15) directly. The result will be a "sum" rotation (or in any case a combination between the two) imposed on the train carrier (20) integral with the second pinion (7) that will turn the trajectory of the car to the right.

Steering side, the sensors (9) will actuate through an electric motor (2) the pinion of the star wheel (22) and hence the star wheel (10) in the opposite direction and therefore with a rotation that would make the car move towards the obstacle. In our example (obstacle on the left), it will rotate the star wheel counter-clockwise (the star wheel will rotate clockwise if the obstacle is detected by the right ultrasonic sensor).

It should therefore be noted that the rotation of the star wheel (10) and of the Ring (18), for the same position of the obstacle/road line, have an opposite direction.

In this mode, the driver will perceive on the steering the feedback substantially due to the power steering (6) that relieves his effort, possibly algebraically added or in any case combined with the torque generated indirectly on the second pinion (7) by the aid (3).

A) It is like B but without aid (3) (not powered in this mode). In practice there will only be a visual aid and no aid (3) intervention on the rack of the axle of the wheels (21). In this case, the driver will perceive on the steering the feedback substantially due to the power steering (6) which relieves his effort and no additional feedback due to the sensors (9), but such feedback, even if only visual, can help the driver to perform the task.

E) It is like A but without even the visual aid: the circuit of the Clutch (4) that actuates the clutch device (17) (see FIG. 3 and FIG. 2) is powered by coupling the star wheel (10) with the steering (14) (before activating the electric circuit of the Clutch an electric pulse can be given for the formation of a magnetic field to align the neutral point of the star wheel with the neutral point of the steering). The input of the driver (13) is the only input (of interest to this invention) of the control unit (5) of the power steering (6) that will drive the axle of the wheels (21). In this case, the driver will perceive on the steering the feedback substantially due to the power steering that relieves his effort and no additional feedback due to the sensors. In this case, the electric circuit (2) is not powered either.

C) Additionally, compared to mode B there is the fact that the star wheel (10), for example through an electromagnet or the Clutch (17) of FIG. 3, is made integral with the steering (14) for a few instants or seconds. The driver, as a result, if there is an obstacle approaching on the left, will perceive the steering moving towards the obstacle, but de facto, the "same" rotation (see below) in the opposite direction, though (of at least equal amount) is added or in any case combined with that of the driver, on the rack (21) of the wheels. So in those few instants or seconds the input of the control unit will only be that of the driver (13) (if CR and CA cancel each other out), then when the magnet/Clutch (17) is decoupled the input of the control unit will consist of the sum or in any case of the combination between the input of the driver (13) and the input (3) of the sensors (9) and at the same time the star wheel (10) will continue to move but without the driver perceiving it haptically. For CR and CA to cancel each other out, it must be ensured that the rotations of star wheel (10) and the rotation component generated by the Ring (18) on the second pinion (7) are the same, for example by properly choosing the pinion diameters of the star wheel (10), pinion (7) and various components of the epicyclic gear train (8) and/or by providing a greater torque on the Ring side. The driver will perceive for a few instants or seconds the feedback of the star wheel on the steering and then the feedback substantially due to the power steering (6) that relieves his effort, possibly added or in any case combined with the torque generated indirectly on the second pinion (7) by the aid (3). The important concept is that the opposite rotation of the star wheel (10) should in no way be transferred for safety reasons on the axle of the wheels and for this reason it is important that, on the axle of the wheels, the effect of CR is less than or equal to the effect of CA.

D) As long as this mode is selected, the coupling between star wheel (10) and steering (14) is maintained and therefore all the considerations that were made in the previous case are valid, that is, like in the first instants or seconds of the mode C above, in which star wheel (10) and steering (14) are integral. In this case, the driver will perceive for as long as this mode is selected, the feedback of the star wheel on the steering, (the input of the control unit (5) will only be that of the driver (13), if CR and CA cancel each other out), in addition to the feedback due to the power steering (6) that relieves his effort.

While in the DBW version (and even more so in the video game version) one conveniently adds the two torques (CD and CA) through the control unit/computer (11) if and when one wishes so (depending on the driving mode selected), in the mechanical version it is to be considered, in the case of an epicyclic gear train (8), that a different output of the train carrier (20) is produced depending on whether the Ring (18) is stationary or in motion.

In fact:

if the Ring (18) is stationary (or because the electric circuit (3) is not powered, such as in driving modes A and E, or because the object is at a distance in absolute value greater than the set activation value), the second pinion (7) of the train carrier (20) will have a rotation equal to about ⅓ with respect to that imposed by the driver through the Sun pinion (15). In this case, the same steering angle/torque (13) imposed by the driver on the pinion (1) can be inputted to the control unit (5) of the power steering (6) and the power steering (6) will be commanded by the same stored bends.

if the Ring is in motion (driving mode B, C, D and the object is at a distance in absolute value lower than the set activation value), the pinion of the train carrier (7) will have a different rotation than the Sun only (15) or the Ring only (18). Also in this case the input of the control unit (5) of the power steering (6) will have the same steering angle/torque (13) read on the steering pinion (1) and imposed directly by the driver. Any additional movement produced by the sensors (3), is precisely an addition that can be scaled as desired to make the driver perceive it more or less decisively. Note that if the driver does not intervene on the steering (14), the Ring (18) will still make the car turn but less and the obstacle could still not be avoided. One can think of a safety action of the type in which if (3) is powered and therefore produces a torque and the pinion (1) does not move (i.e., the steering torque (13) is null), then an audible alarm or voice says for example "turn to the right/left". In this case (Ring in motion), be AlfaSun the steering angle imposed by the driver and AlfaRing the "steering" angle produced by the sensors (9), 6 possibilities are described by way of example to illustrate in a simple way the various scenarios that can be created:

a) Rotation angle of the Sun (15) (AlfaSun) and rotation angle of the Ring (18) (AlfaRing) have the same direction and AlfaSun=AlfaRing: the pinion of the train carrier (7) will move by the same angle; the power steering (6) will be commanded by the same stored bends (by the steering torque imposed by the driver (13), by the number of engine revolutions, by the vehicle speed, by the steering angle of the driver AlfaSun, by the steering speed imposed by the driver and by the characteristic bends stored in the control unit (5), the control unit (5) obtains the torque for power-assistance (6) which will be the active torque on the rack of the axle of the wheels);

b) Rotation angle of the Sun (15) and rotation angle of the Ring (18) have the same direction and AlfaSun>AlfaRing: the pinion of the train carrier (7) will move by an angle > with respect to the one that one would have if the Ring were stationary; for the same steering speed imposed by the driver (13), by the number of engine revolutions, by the vehicle speed, by the steering angle of the driver AlfaSun, by the steering speed imposed by the driver and by the characteristic bends stored in the control unit, the torque of the power-assistance of the previous case (a) will also be added to the torque of the pinion (7) of the train carrier (20) and therefore, the active torque on the rack of the axle of the wheels (21) will be greater than the previous case (a) (example: obstacle on the left, steering with greater sum on the right);

c) Rotation angle of the Sun (15) and rotation angle of the Ring (18) have the same direction and AlfaSun<AlfaRing (closer obstacle than in the previous case): the pinion (7) of the train carrier (20) will move by an angle > compared to the previous case (b) and the active torque on the rack of the axle of the wheels (21) will be greater than the previous case (b) (example: closer obstacle on the left, steering with greater sum on the right);

d) Rotation angle of the Sun (15) and rotation angle of the Ring (18) have opposite direction and (AlfaSun)=AlfaRing (example: the driver is steering to the right and there is an obstacle on the right): the pinion (7) of the train carrier (20) would not move but does so only due to the power steering (6) (the active torque on the rack of the axle of the wheels (21) is the same as in the first case (a)).

e) Rotation angle of the Sun (15) and rotation angle of the Ring (18) have opposite direction and in absolute value AlfaSun>AlfaRing (example: the driver is steering to the right and there is an obstacle on the far right): the pinion (7) of the train carrier will move by an angle < with respect to the one that one would have if the Ring (18) were stationary; with the same steering torque imposed by the driver (13), by the number of engine revolutions, by the speed of the vehicle, by the steering angle of the driver AlfaSun, by the steering speed imposed by the driver and by the characteristic bends stored in the control unit, the torque of the pinion (7) of the train carrier (20) will be subtracted from the power-assistance torque (6) of the previous case (d) and therefore, the active torque on the rack of the axle of the wheels (21), will be lower than the previous case (d) (example: obstacle on the right, steering with lower sum to the right);

f) Rotation angle of the Sun (15) and rotation angle of the Ring (18) have opposite direction and AlfaSun<AlfaRing (example: obstacle on the right closer than the previous case): the pinion (7) of the train carrier (20) will move by an angle > compared to the previous case and at a torque of the pinion (7) of the train carrier (20) greater than the previous case (e) will be subtracted from the torque of the power-assistance (6) of the previous case (e) and therefore, the active torque on the rack of the axle of the wheels (21), will be greater than the previous case (e) (example: the total steering on the right will be lower than the previous case (e)).

The activation/deactivation of the 5 driving modes can be done through the keys that will act as a switch closing/opening the different circuits that are powered or not, depending on the mode chosen:

In the Mechanical version (FIG. 1 and FIG. 4): if key E is selected, the Clutch is powered but only in the sense that steering and star wheel are made integral but de facto no circuit or path is active (in FIG. 1 basically only the path (100) is considered); if key A is selected, only the circuit of the path (200) (FIG. 1)/aid (2) is powered (FIG. 4); if key B is selected, only the circuit of the path (200) (FIG. 1)/aid (2) (FIG. 4) and of the electric motor of the aid (3) of the Ring (FIG. 4)/path (300) (FIG. 1) are powered; if key D is selected, all the circuits of the path (200), (300), (400) (FIG. 1)/aid (2) and (3) and circuit of the Clutch (4) (FIG. 4) are powered; if key C is selected, all the circuits of the path except that of the Clutch (400) (FIG. 1)/(4) (FIG. 4) which will be powered only for a few instants or seconds are powered.

In the DBW version (FIG. 1 and FIG. 2): if key E is selected, the Clutch is powered but only in the sense that steering and star wheel are integral but de facto no circuit or path is active (in FIG. 1, basically only the path (100) is considered); if key A is selected, only the circuit of the visual feedback of the path of the star wheel of the path (200) is powered (FIG. 1)/aid (2) (FIG. 2); if key B is selected, only the circuit of the path (200) (FIG. 1)/aid (2) (FIG. 2) is powered and the control unit/computer (11 in FIG. 2) uses the input of the electric motor of the aid (3) (FIG. 2)/path (300) (FIG. 1); if key D is selected, all the circuits of the aids (2), (3) (the control unit uses the input of the electric motor of the aid (3)), (4) (FIG. 2)/path (200), (300), (400) (FIG. 1) are powered; if key C is selected, all the circuits are powered except that of the Clutch (4) (FIG. 2)/path (400) (FIG. 1) which will only be powered for a few seconds.

Note that in both versions (including the video game version), (100) (FIG. 1)/(1) (FIG. 2) it is always active because the driver must always have an active role. The aid (3) (FIG. 2 and FIG. 4)/path (300) (FIG. 1) must only help it to carry out the task without excluding it! Furthermore, again in all versions, a mathematical model of the vehicle (and in general of the whole scenario) could be used and make sure that the aid intervenes only if through some calculations it turns out that the action of the driver at time t alone is not enough to bring in a time t+1 the vehicle at a greater distance than the activation value (a determined value chosen according to the particular task, combined with a certain tolerance threshold to avoid problems of instability of the system in the sense of oscillations around the target distance).

The invention claimed is:

1. Steering system comprising: a rotatably mounted command member, the rotation of which is aimed at transmitting first command signals to a steering box, the steering box sets the steering angle of the wheels of a vehicle, the command member comprising a star wheel mounted inside said command member in a rotatable manner with respect to said command member; and a sensor system being present aimed at detecting the distance of the vehicle from reference points, said sensor system being connected at least to said star wheel; said sensor system comprising the activation of the rotation of the star wheel; which activation means are configured to rotate and orient the star wheel in the direction or in the opposite direction of said reference points, wherein a cover element of the command member made of transparent material is present, said cover element in transparent material being mounted integral with the command member, a clutch device being present, configured to make the command member and the star wheel integral according to the driving modes of the vehicle.

2. System according to claim 1, wherein said sensor system is connected to said steering box, said sensor system being configured to generate second command signals to contribute to setting the steering angle of the wheels of a vehicle.

3. System according to claim 1, wherein a driving mode selection device is provided, which selection device sets the operating conditions of the sensor system.

4. System according to claim 1, wherein said command member is connected to the steering box through mechanical transmission means.

5. System according to claim 4, wherein said mechanical transmission means comprise an epicyclic gear train, which epicyclic gear train combines the rotation of the steering pinion, which steering pinion is activated by the torque acting on the command member with the rotation of a toothed ring, which toothed ring is activated by the torque produced by the sensors producing a torque through the rotation of a second pinion integral with the train carrier of the epicyclic gear train which provides as output a torque acting on the axle of the wheels of the vehicle.

6. System according to claim 1, wherein said command member is connected to the steering box through electric transmission means.

7. System according to claim 6, wherein said electric transmission means comprise a torque sensor in the command member configured to read the torsional moment exerted on the command member, which torsional moment, combined by a control unit with the torque created by the sensors is converted into axial movement of the axle of the wheels through a solenoid valve.

8. System according to claim 1, wherein said steering box comprises a system for generating a virtual environment, in which a virtual vehicle comprising said sensor system is present.

9. System according to claim 1, wherein there are provided means for adjusting the amount of torque applied on the star wheel and/or on the axle of the wheels starting from the second command signals, based on the distance of the vehicle from said reference points.

10. Vehicle command method, which method uses the system according to claim 1, characterized in that it includes the following steps:

a) detection of the distance of the vehicle from one or more reference points;
b) rotation and orientation of the star wheel in the direction or in the opposite direction of said one or more reference points; and
c) generation of a torque to be transmitted to the steering box based on the distance detected and in an opposite direction with respect to the rotation of the star wheel.

* * * * *